(12) United States Patent
Yuan et al.

(10) Patent No.: US 12,015,307 B2
(45) Date of Patent: Jun. 18, 2024

(54) COIL COMPONENT AND ELECTRONIC EXPANSION VALVE WITH COIL COMPONENT

(71) Applicant: ZHEJIANG DUNAN ARTIFICIAL ENVIRONMENT CO., LTD., Zhejiang (CN)

(72) Inventors: Bofeng Yuan, Zhejiang (CN); Yuanyang Lin, Zhejiang (CN)

(73) Assignee: ZHEJIANG DUNAN ARTIFICIAL ENVIRONMENT CO., LTD., Zhejiang (CN)

( * ) Notice: Subject to any disclaimer, the term of this patent is extended or adjusted under 35 U.S.C. 154(b) by 394 days.

(21) Appl. No.: 17/435,693

(22) PCT Filed: Mar. 13, 2020

(86) PCT No.: PCT/CN2020/079276
§ 371 (c)(1),
(2) Date: Sep. 1, 2021

(87) PCT Pub. No.: WO2020/199900
PCT Pub. Date: Oct. 8, 2020

(65) Prior Publication Data
US 2022/0158507 A1    May 19, 2022

(30) Foreign Application Priority Data

Apr. 2, 2019   (CN) .......................... 201910260683.7

(51) Int. Cl.
*H02K 1/12*        (2006.01)
*F16K 31/06*       (2006.01)
(Continued)

(52) U.S. Cl.
CPC ........... *H02K 1/12* (2013.01); *F16K 31/0655* (2013.01); *F16K 31/0675* (2013.01);
(Continued)

(58) Field of Classification Search
CPC .... F16K 27/04; F16K 27/048; F16K 31/0655; F16K 31/0675; F16K 31/08;
(Continued)

(56) References Cited

U.S. PATENT DOCUMENTS 10,431,362 B1    10/2019   Hazzard et al.
11,329,531 B2 *   5/2022   Billet ...................... F25B 41/35
(Continued)

FOREIGN PATENT DOCUMENTS

CN    102142727 A    8/2011
CN    103016821 A    4/2013
(Continued)

OTHER PUBLICATIONS

EPO's Supplementary Search Report for corresponding application EP20783379.9; Report dated Nov. 16, 2022.

*Primary Examiner* — Matthew W Jellett
(74) *Attorney, Agent, or Firm* — Samson G. Yu

(57) ABSTRACT

Disclosed are a coil component and an electronic expansion valve with the coil component. The coil component includes an injection molded part, a stator housing, a stator pole plate and a circuit board. The stator housing, the stator pole plate and the circuit board are all provided in the injection molded part. The coil component further includes: a fixing part, the fixing part is provided in the injection molded part; a conductive part, the conductive part is provided on the fixing part, and the conductive part is configured to conductively connect at least one of the stator housing and the stator pole (Continued)

plate to the circuit board; and a sensor, the sensor is provided on the fixing part, and the sensor is connected to the circuit board.

20 Claims, 9 Drawing Sheets

(51) Int. Cl.
*F16K 37/00* (2006.01)
*H01F 7/128* (2006.01)
*H02K 5/04* (2006.01)
*H02K 11/00* (2016.01)
*H02K 11/20* (2016.01)

(52) U.S. Cl.
CPC ......... *F16K 37/0083* (2013.01); *H01F 7/128* (2013.01); *H02K 5/04* (2013.01); *H02K 11/0094* (2013.01); *H02K 11/20* (2016.01)

(58) Field of Classification Search
CPC ....... F16K 37/0083; H02F 7/128; H02K 1/12; H02K 3/525; H02K 5/04; H02K 11/0094; H02K 11/20; H02K 11/21; H02K 11/30; H02K 11/40; H05K 2201/1003
See application file for complete search history.

(56) References Cited

U.S. PATENT DOCUMENTS

| | | | | |
|---|---|---|---|---|
| 2005/0275297 | A1* | 12/2005 | Suzuki | .................. H02K 5/225 310/71 |
| 2017/0002931 | A1 | 1/2017 | Shu et al. | |
| 2021/0140556 | A1* | 5/2021 | Zhang | ..................... F16K 31/04 |

FOREIGN PATENT DOCUMENTS

| | | |
|---|---|---|
| CN | 104565475 A | 4/2015 |
| CN | 107345590 A | 11/2017 |
| CN | 107620824 A | 1/2018 |
| CN | 107763284 A | 3/2018 |
| CN | 104283397 B | 5/2018 |
| CN | 108006302 A | 5/2018 |
| CN | 108730600 A | 11/2018 |
| CN | 208190467 U | 12/2018 |
| DE | 10351504 A1 | 6/2005 |
| EP | 1608052 A2 | 12/2005 |
| EP | 1608052 A3 | 5/2007 |
| JP | 2007134553 A | 5/2007 |
| JP | 5619526 B2 | 11/2014 |
| JP | 2019032024 A | 2/2019 |

* cited by examiner

COIL COMPONENT AND ELECTRONIC EXPANSION VALVE WITH COIL COMPONENT

CROSS-REFERENCE TO RELATED APPLICATION

The present disclosure is a national stage application of International Patent Application No. PCT/CN2020/079276, which is filed on Mar. 13, 2020. The present disclosure claims priority to patent application No. 201910260683.7, filed to the China National Intellectual Property Administration on Apr. 2, 2019 and entitled "Coil component and electronic expansion with coil component".

TECHNICAL FIELD

The present disclosure relates to the field of expansion valves, and in particular to a coil component and an electronic expansion valve with the coil component.

BACKGROUND

In an electronic expansion valve in a technology known to inventors, there is a problem that during a process that a coil is electrified and de-electrified, a stator pole plate and a stator housing of the coil may generate static electricity. If this part of the static electricity is not discharged from the coil in time, this part of the charge may affect other components.

However, the electronic expansion valve in the technology known to inventors does not have good measures to guide the static electricity generated by the stator pole plate and the stator housing out of the coil, and it is impossible to avoid an effect of this part of the charge on other components of the electronic expansion valve.

SUMMARY

The main purpose of the present disclosure is to provide a coil component and an electronic expansion valve having the same, so as to solve a problem in a technology known to inventors that static electricity generated by a stator pole plate and a stator housing may not be discharged.

According to one aspect of the present disclosure, a coil component is provided, it includes an injection molded part, a stator housing, a stator pole plate, and a circuit board. The stator housing, the stator pole plate, and the circuit board are all arranged in the injection molded part, and the coil component also includes a fixing part, a conductive part, and a sensor. The fixing part is arranged in the injection molded part. The conductive part is arranged on the fixing part, and the conductive part is configured to conductively connect at least one of the stator housing and the stator pole plate to the circuit board. The sensor is arranged on the fixed part, and the sensor is connected with the circuit board.

In some embodiments, a first connecting part is arranged on the fixing part, and a second connecting part is arranged on the conductive part, the first connecting part is connected with the second connecting part.

In some embodiments, the first connecting part includes a protrusion, the second connecting part includes a positioning hole, and the first connecting part passes through the second connecting part. Or the first connecting part includes a positioning hole, the second connecting part includes a protrusion, and the second connecting part passes through the first connecting part.

In some embodiments, the fixing part is made of plastic, the first connecting part includes a protrusion, and the second connecting part is a positioning hole. Wherein, the first connecting part and the second connecting part are fixedly connected by hot riveting or ultrasonic welding.

In some embodiments, a first mounting groove is arranged on the fixing part, and the first connecting part is arranged in the first mounting groove. Wherein, at least part of the conductive part is arranged in the first mounting groove.

In some embodiments, the conductive part includes an elastic sheet, the conductive part is connected with the circuit board, and at least one of the stator housing and the stator pole plate is connected with the conductive part.

In some embodiments, the stator housing is connected with the stator pole plate, and the at least one of the stator housing and the stator pole plate is contacted with the conductive part.

In some embodiments, the conductive part includes a first conductive section, a second conductive section and an abutting section. The first conductive section is connected with the fixing part. The second conductive section is connected with the circuit board. The abutting section is a curved section, and the abutting section abuts against the stator housing. Herein, the first conductive section is located between the abutting section and the second conductive section, as to connect the second conductive section and the abutting section.

In some embodiments, the fixing part is provided with a through hole, and the sensor includes a body part arranged on the fixing part and a pin arranged on the body part. The pin passes through the through hole and is connected with the circuit board.

In some embodiments, a second mounting groove is arranged at an end, away from the circuit board, of the fixing part, the body part is arranged in the second mounting groove, a side, away from the conductive part, of the fixing part is provided with an accommodating groove, and a part of the pin is arranged in the accommodating groove.

In some embodiments, the injection molded part is provided with a limiting groove, and the fixing part is arranged in the limiting groove.

According to another aspect of the present disclosure, an electronic expansion valve is provided, including the above coil component.

The coil component of some embodiments of the present disclosure achieves a conductive connection of at least one of the stator housing and the stator pole plate with the circuit board through the conductive part, namely a static electricity generated from the stator housing and the stator pole plate is sent to the circuit board for treatment through the conductive part, thereby the effect of the static electricity generated on the stator housing and the stator pole plate to the coil component is avoided, and the problem in the technology that the static electricity generated by the stator pole plate and the stator housing may not be discharged is solved.

BRIEF DESCRIPTION OF THE DRAWINGS

Drawings of the description for constituting a part of the present disclosure are used to provide further understanding of the present disclosure, and exemplary embodiments of the present disclosure and descriptions thereof are used to explain the present disclosure, and do not constitute improper limitation to the present disclosure. In the drawings.

Figure 1:
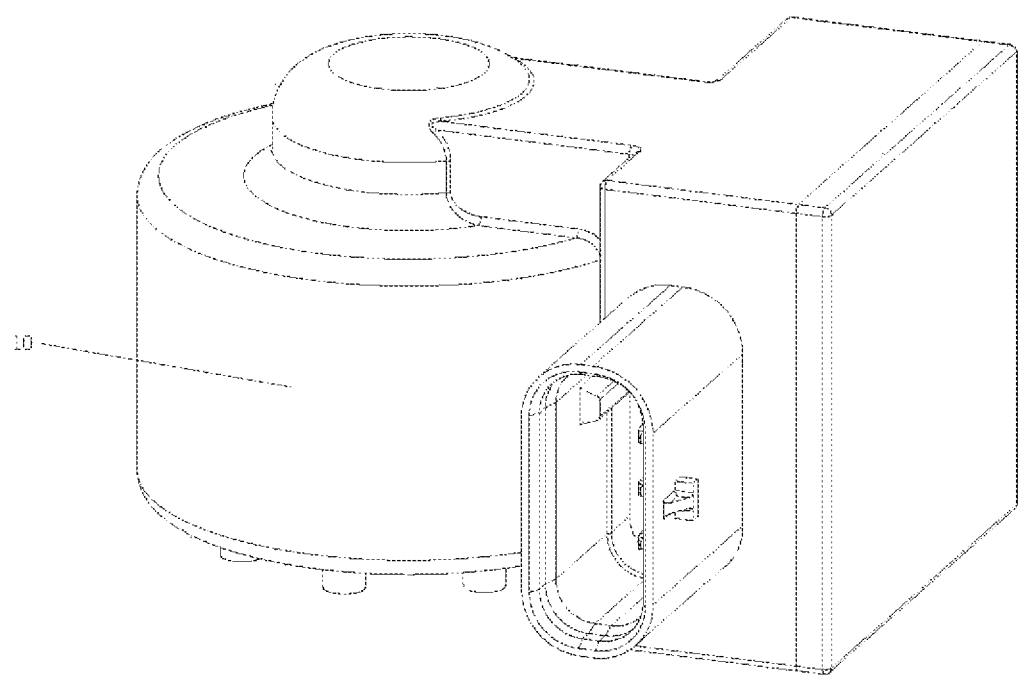
FIG. 1 shows a structure schematic diagram from a first view angle of a coil component according to an embodiment of the present disclosure.
Figure 2:
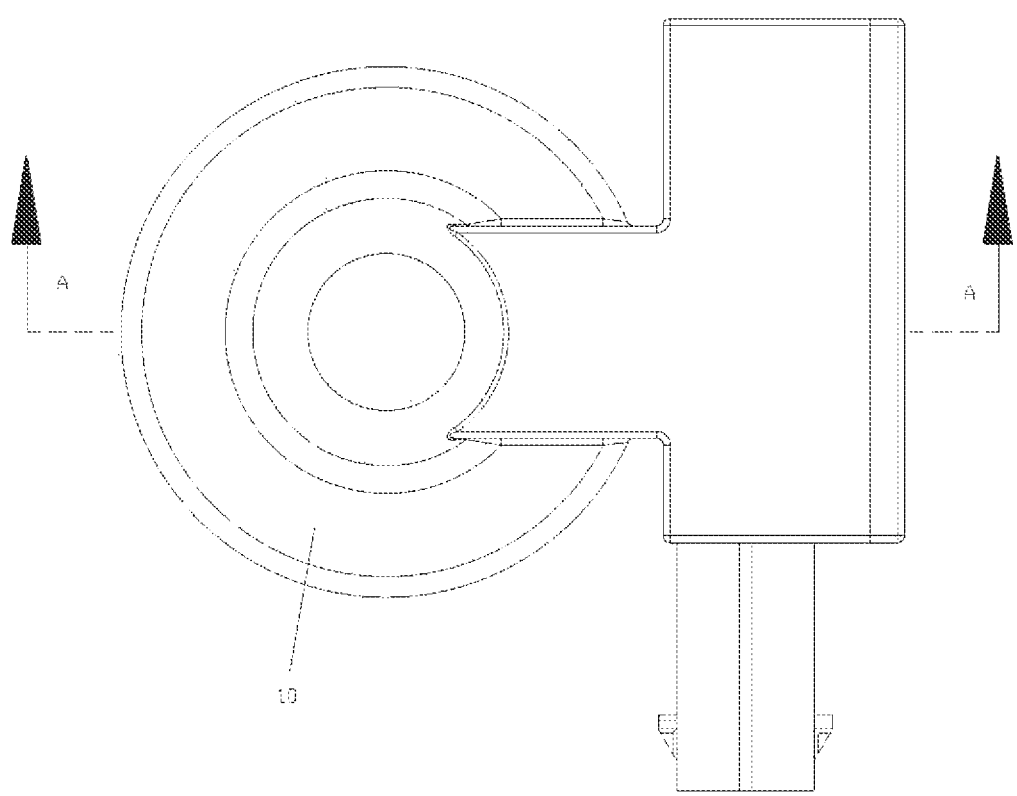
FIG. 2 shows a structure schematic diagram from a second view angle of the coil component according to the embodiment of the present disclosure.

Herein, the above drawings include the following reference signs:

10. Injection molded part, 11. Limiting groove, 20. Stator housing, 30. Stator pole plate, 40. Circuit board, 50. Fixing part, 51. First connecting part, 52. First mounting groove, 53, Through hole, 54. Second mounting groove, 55. Accommodating groove, 60. Conductive part, 61. Second connecting part, 62. First conductive section, 63. Second conductive section, 64. Abutting section; 70. Sensor, 71. Body part, 72. Pin, 80. Winding, 90. Valve body, 100. Rotor component, 110. Valve needle component, 111. Screw component, 112. Valve needle, and 113. Nut component.

DETAILED DESCRIPTION OF THE EMBODIMENTS

It should be noted that embodiments in the present disclosure and features in the embodiments may be combined with each other in the case without conflicting. The present disclosure is described below in detail with reference to drawings and in combination with the embodiments.

It should be pointed out that the following detailed descriptions are all illustrative and are intended to provide further descriptions for the present disclosure. Unless otherwise specified, all technical and scientific terms used herein have the same meaning as commonly understood by those of ordinary skill in the art to which the present disclosure belongs.

It should be noted that the terms used here are only for describing specific implementation modes, and are not intended to limit the exemplary implementation modes according to the present disclosure. As used herein, unless otherwise specified clearly in the context, the singular form is also intended to include the plural form. In addition, it should also be understood that while the terms "comprising" and/or "including" are used in the description, it indicates that there are features, steps, operations, devices, components, and/or combinations thereof.

Some embodiments of the present disclosure provide a coil component. Please refer to FIG. 1 to FIG. 8. The coil component includes an injection molded part 10, a stator housing 20, a stator pole plate 30, and a circuit board 40. The stator housing 20, the stator pole plate 30 and the circuit board 40 are all arranged in the injection molded part 10. The coil component further includes a fixing part 50, a conductive part 60 and a sensor 70. The fixing part 50 is arranged in the injection molded part 10. The conductive part 60 is arranged on the fixing part 50, and the conductive part 60 is configured to conductively connect at least one of the stator housing 20 and the stator pole plate 30 to the circuit board 40. The sensor 70 is arranged on the fixing part 50, and the sensor 70 is connected with the circuit board 40.

The coil component of the present disclosure achieves a conductive connection of at least one of the stator housing 20 and the stator pole plate 30 with the circuit board 40 through the conductive part 60, namely a static electricity generated on the stator housing 20 and the stator pole plate 30 is sent to the circuit board 40 for treatment through the conductive part 60, thereby the effect of the static electricity generated on the stator housing 20 and the stator pole plate 30 to the coil component is avoided, and the problem in the technology known to inventors that the static electricity generated by the stator pole plate and the stator housing may not be discharged is solved.

In some embodiments, by arranging the conductive part 60 on the fixing part 50, the fixing part 50 is arranged in the injection molded part 10, the conductive part 60 is stably arranged in the injection molded part 10 through the fixing part 50. During an operation of the coil component, the conductive part 60 may not have problems such as displacement, and it is also ensured that the conductive part 60 realizes the conductive connection of at least one of the stator housing 20 and the stator pole plate 30 with the circuit board 40.

In some embodiments, after the static electricity generated on the stator housing 20 and the stator pole plate 30 is transferred to the circuit board 40, the circuit board 40 performs filtering and other treatments on it, as to reduce the influence of the static electricity, and finally it is conducted out.

Figure 3:
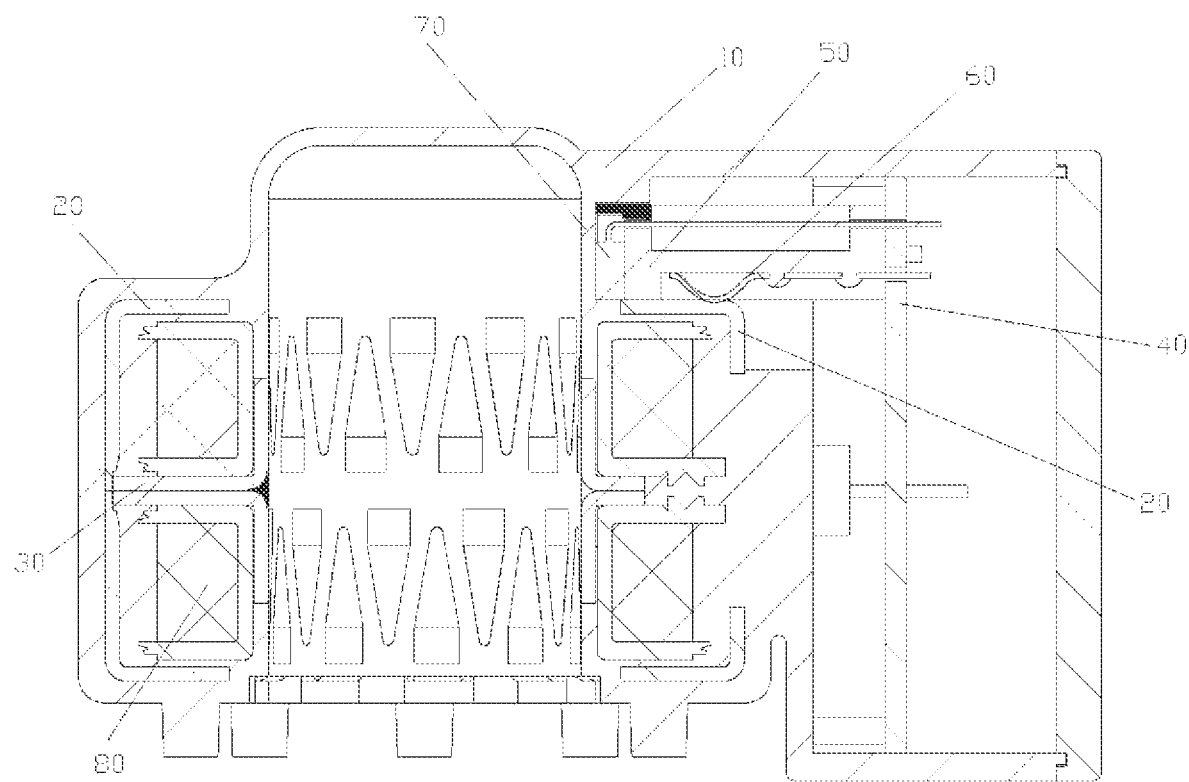
FIG. 3 shows a cross-sectional structure schematic diagram at A-A of the coil component in FIG. 2.

In some embodiments, in order to enable the coil component to obtain a movement signal of the rotor, as shown in FIG. 3, the coil component further includes a sensor 70, the sensor 70 is arranged on the fixed part 50, and the sensor 70 is connected with the circuit board 40.

In some embodiments, the sensor 70 and the conductive part 60 are both arranged on the injection molded part 10 through the fixing part 50, and both are connected with the circuit board 40. The arrangement of the fixing part 50 may not only ensure the stability of the sensor 70 and the conductive part 60, but also may save an entire mounting space.

In some embodiments, the sensor 70 is configured to obtain a displacement signal of the rotor, such as a rotation signal or a movement signal, and the sensor 70 may be a Hall sensor or a position sensor.

Figure 5:
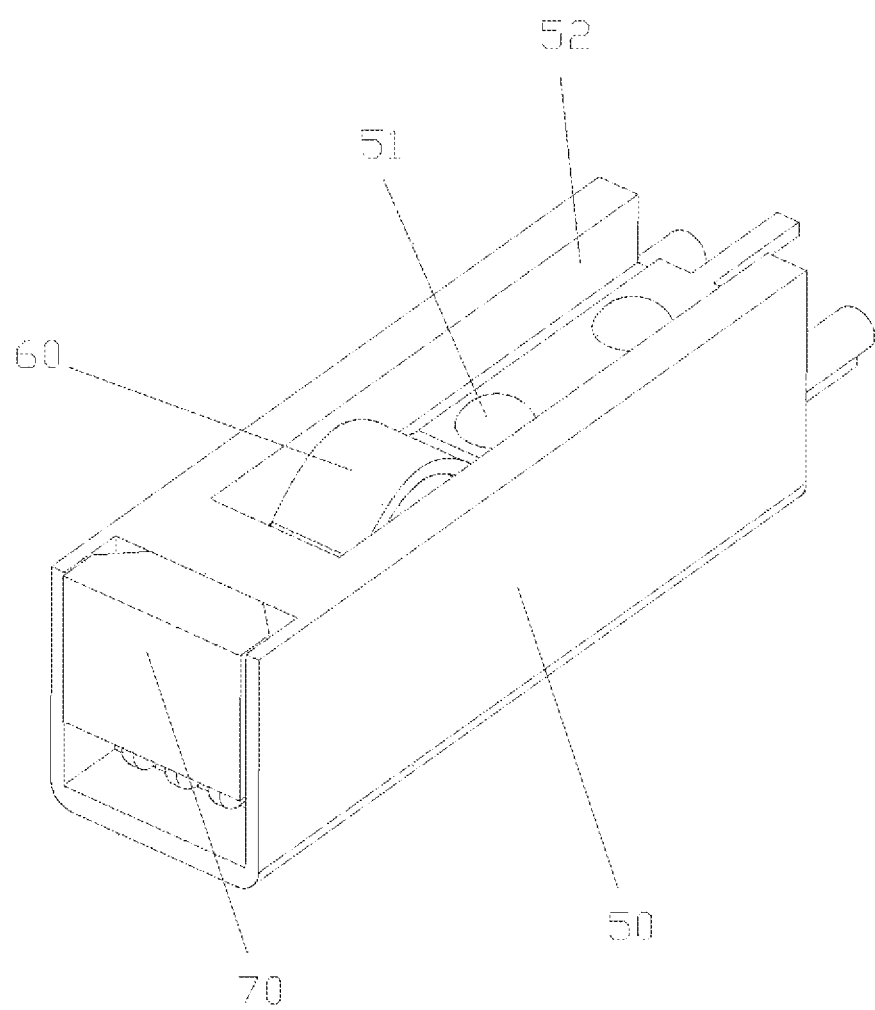
FIG. 5 shows an assembly structure schematic diagram from a first view angle of a fixing part, a conductive part and a sensor of the coil component according to the embodiment of the present disclosure.
Figure 8:
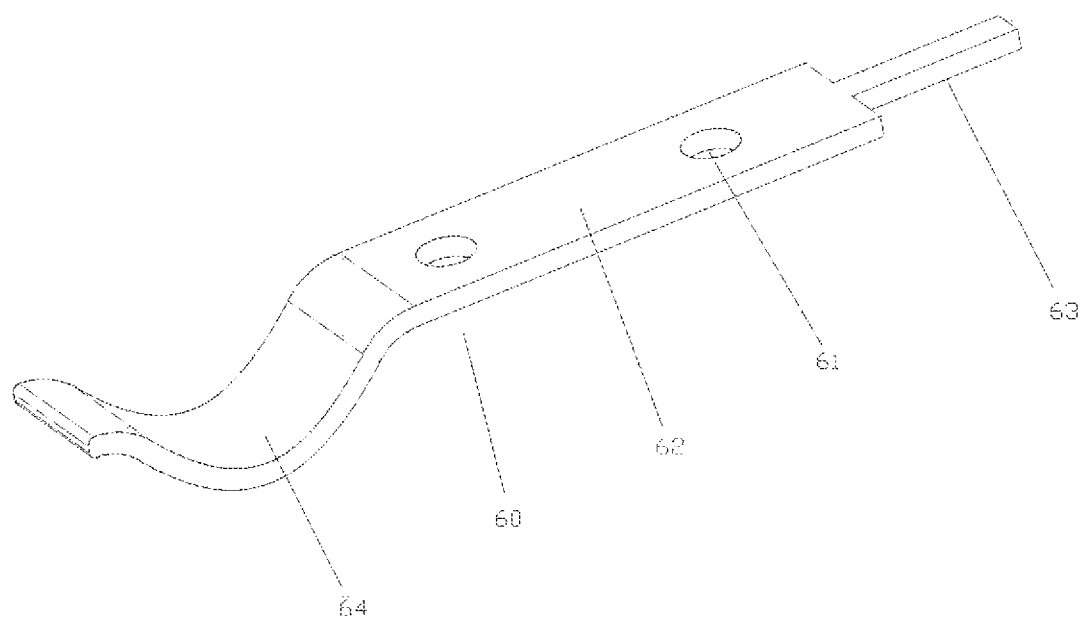
FIG. 8 shows a structure schematic diagram of the conductive part of the coil component according to the embodiment of the present disclosure.

In order to stably arrange the conductive part 60 on the fixing part 50, as shown in FIG. 5 and FIG. 8, a first connecting part 51 is arranged on the fixing part 50, and a second connecting part 61 is arranged on the conductive part 60. The first connecting part 51 is connected with the second connecting part 61.

In some embodiments, the fixing part 50 and the conductive part 60 are stably connected through the first connecting part 51 and the second connecting part 61.

In some embodiments, in order to further improve the connection between the fixing part 50 and the conductive part 60, there are at least two first connecting parts 51, at least two second connecting parts 61, and the at least two first connecting parts 51 and the at least two second connecting part 61 are arranged corresponding to each other one by one.

For the specific structure of the first connecting part 51 and the second connecting part 61, in an embodiment, the first connecting part 51 is a protrusion, the second connecting part 61 is a positioning hole, and the first connecting part 51 passes through the second connecting part 61. Or, the first connecting part 51 is a positioning hole, the second connecting part 61 is a protrusion, and the second connecting part 61 passes through the first connecting part 51.

In some embodiments, the fixing part 50 is made of plastic, the first connecting part 51 is a protrusion, and the second connecting part 61 is a positioning hole. Herein, the first connecting part 51 and the second connecting part 61 are fixedly connected by hot riveting or ultrasonic welding.

In some embodiments, the fixing part 50 is a plastic product, and the first connecting part 51 is a protrusion on the fixing part 50. In a specific mounting process, the first connecting part 51 passes through the second connecting part 61, and then the first connecting part 51 is treated by the hot riveting or ultrasonic welding, so that the first connecting part 51 is deformed, and finally the second connecting part 61 is wrapped, namely a positioning cap is formed at an orifice of the positioning hole. In this way, the stable connection between the first connecting part 51 and the second connecting part 61 is ensured.

In order to conveniently mount and take into account a compactness of the structure, as shown in FIG. 5, in some embodiments, a first mounting groove 52 is arranged on the fixing part 50, and the first connecting part 51 is arranged in the first mounting groove 52. Herein, at least part of the conductive part 60 is arranged in the first mounting groove 52.

In some embodiments, the first mounting groove 52 is a rectangular groove, and a partial body of the fixing part 50 is arranged in the first mounting groove 52.

In some embodiments, the conductive part 60 is an elastic sheet, the conductive part 60 is connected with the circuit board 40, and at least one of the stator housing 20 and the stator pole plate 30 is connected with the conductive part 60.

In some embodiments, the conductive part 60 is an elastic sheet, the elastic sheet is pressed on at least one of the stator housing 20 and the stator pole plate 30, namely it is clamped between a groove wall of the first mounting groove 52 and the at least one of the stator housing 20 and the stator pole plate 30.

In some embodiments, the stator housing 20 and the stator pole plate 30 are connected, and at least one of the stator housing 20 and the stator pole plate 30 abuts against the conductive part 60.

In some embodiments, the stator housing 20 and the stator pole plate 30 are connected, namely the stator housing 20 and the stator pole plate 30 are always in a conductive communication state. Therefore, after at least one of the stator housing 20 and the stator pole plate 30 is connected with the conductive portion 60, it may be ensured that both the stator housing 20 and the stator pole plate 30 are in conductive communication with the circuit board 40.

In some embodiments, the conductive part 60 is pressed and arranged on the stator housing 20.

For the specific structure of the conductive part 60, as shown in FIG. 8, the conductive part 60 includes a first conductive section 62, a second conductive section 63 and an abutting section 64. The first conductive section 62 is connected with the fixing part 50. The second conductive section 63 is connected with the circuit board 40. The abutting section 64 is a curved section, and the abutting section 64 abuts against the stator housing 20. Herein, the first conductive section 62 is located between the abutting section 64 and the second conductive section 63, as to connect the second conductive section 63 and the abutting section 64.

In some embodiments, the conductive portion 60 is composed of the first conductive section 62, the second conductive section 63, and the abutting section 64. Herein, the first conductive section 62 is configured to connect the second conductive section 63 and the abutting section 64. The second conductive section 63 is welded with the circuit board 40, the first conductive section 62 is provided with the second connecting part 61 for connecting with the first connecting part 51 on the fixing part 50, and the abutting section 64 is pressed and arranged on the stator housing 20.

In some embodiments, the first conductive section 62 and the second conductive section 63 are both rectangular, and a width of the first conductive section 62 is larger than a width of the second conductive section 63.

In some embodiments, the first conductive section 62 is arranged in the first mounting groove 52 of the fixing part 50, and a projection of the abutting section 64 towards the first mounting groove 52 is also located in the first mounting groove 52.

Figure 6:
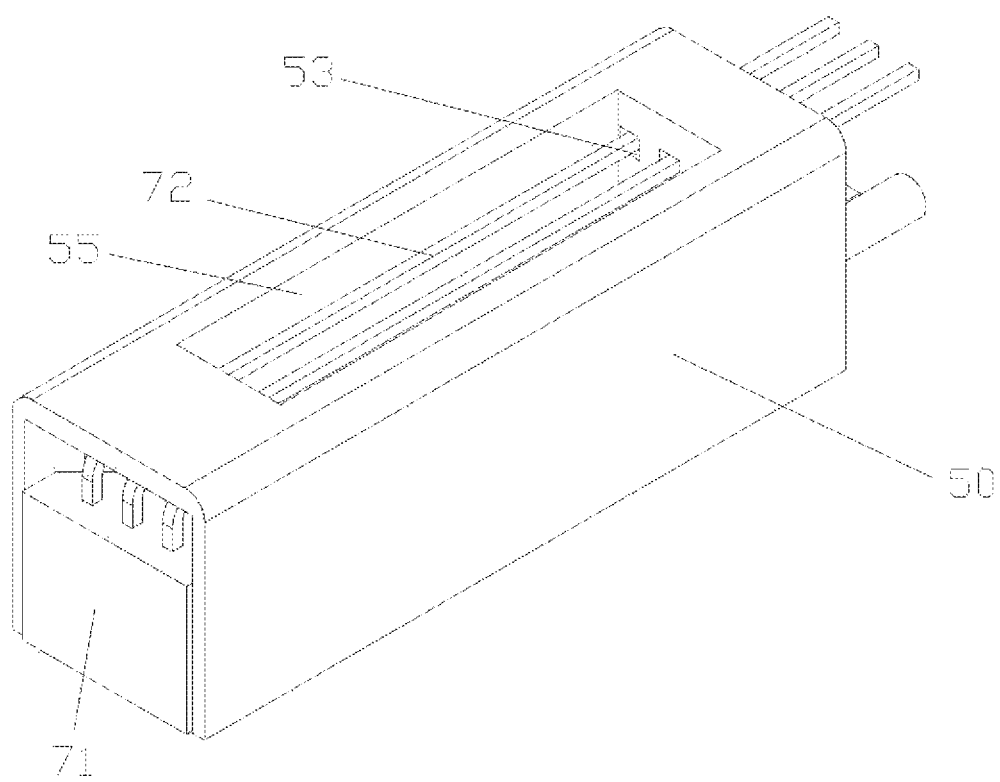
FIG. 6 shows an assembly structure schematic diagram from a second view angle of the fixing part, the conductive part and the sensor of the coil component according to the embodiment of the present disclosure.
Figure 7:
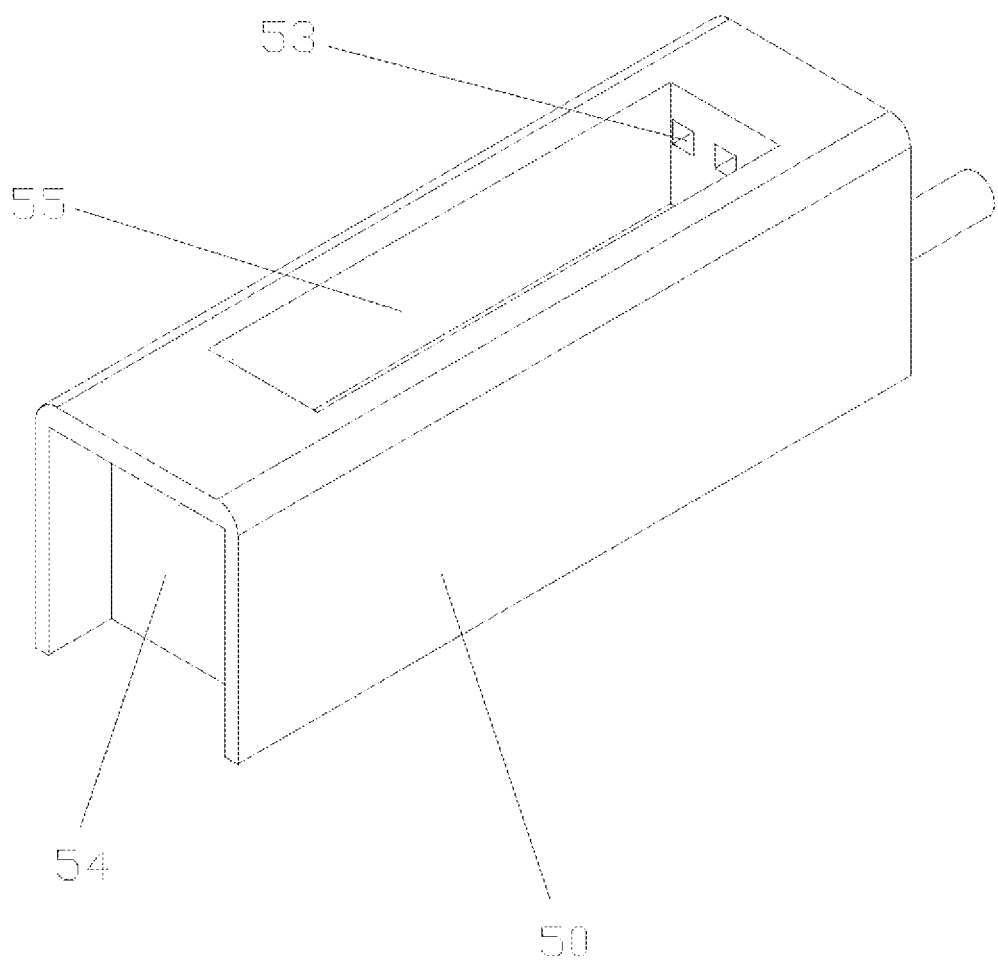
FIG. 7 shows a structure schematic diagram of the fixing part of the coil component according to the embodiment of the present disclosure.

For the specific mounting structure of the sensor 70 and the fixing part 50, as shown in FIG. 6, a through hole 53 is arranged on the fixing part 50. The sensor 70 includes a body part 71 and a pin 72. The body part 71 is arranged on the fixing part 50. The pin 72 is arranged on the body part 71, and the pin 72 passes through the through hole 53 and is connected with the circuit board 40.

In some embodiments, the pin 72 on the body part 71 is connected with the circuit board 40 after passing through the through hole 53, but the body part 71 itself does not have a connection relationship with the fixing part 50, and ultimately it is fixed and positioned by depending on the pin 72 and the through hole 53.

In some embodiments, an end, away from the circuit board 40, of the fixing part 50 is provided with a second mounting groove 54, the body part 71 is arranged in the second mounting groove 54, and a side, away from the conductive part 60, of the fixing part 50 is provided with an accommodating groove 55, and a part of the pin 72 is arranged in the accommodating groove 55.

In some embodiments, the second mounting groove 54 is a rectangular cavity, the second mounting groove 54 and the first mounting groove 52 are respectively located on both sides of the fixing part 50, and the groove walls of the accommodating groove 55 are provided with the through holes 53. Namely, there are through holes 53 between the second mounting groove 54 and the accommodating groove 55 and between the conductive part 60 and the accommodating groove 55.

In some embodiments, there are a plurality of through holes 53, and the plurality of the through holes 53 are arranged at intervals along an extension direction of the pin 72. Herein, the through holes 53 are arranged on one side, away from the conductive part 60, of the fixing part 50.

In some embodiments, there are three pins 72, and the through holes 53 are correspondingly three groups.

Figure 4:
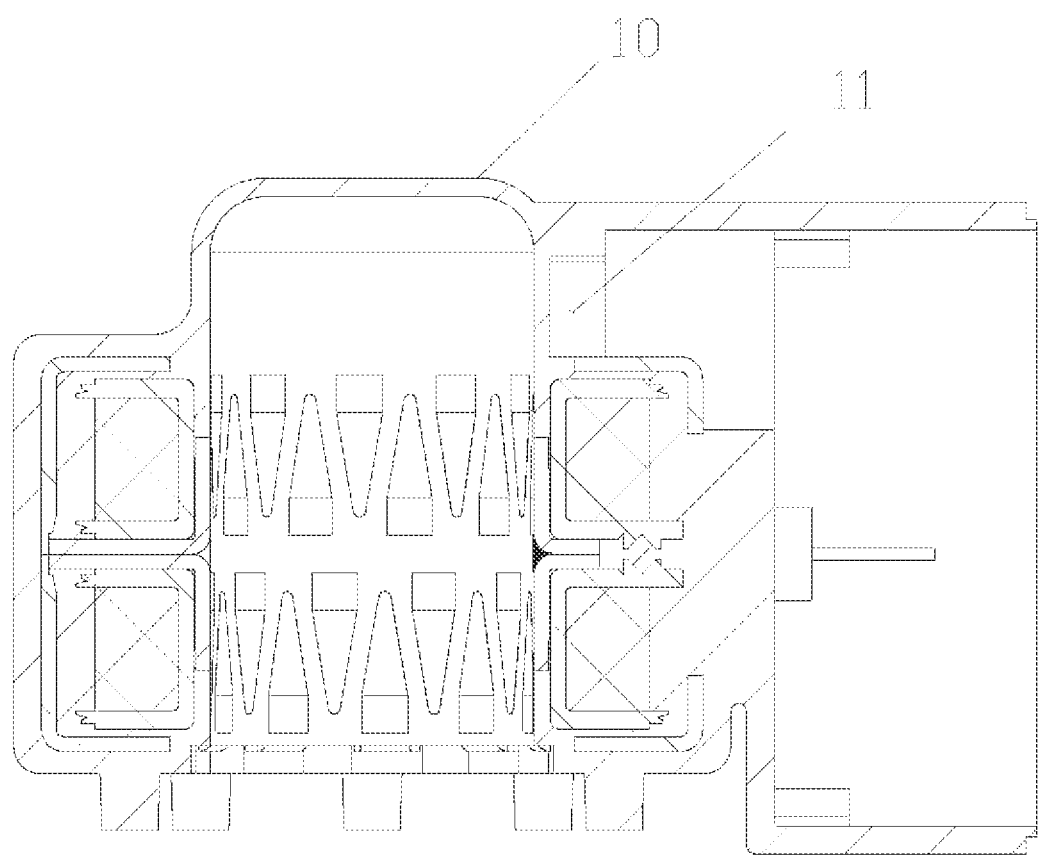
FIG. 4 shows a partial structure schematic diagram of the coil component according to the present disclosure.

In order to stably arrange the fixing part 50 on the injection molded part 10, as shown in FIG. 4, the injection molded part 10 is provided with a limiting groove 11, and the fixing part 50 is arranged in the limiting groove 11.

In some embodiments, the limiting groove 11 is a rectangular groove, and a partial body of the fixing part 50 is arranged in the limiting groove 11.

The present disclosure also provides an electronic expansion valve, including a coil component, and the coil component is the above coil component.

Figure 9:
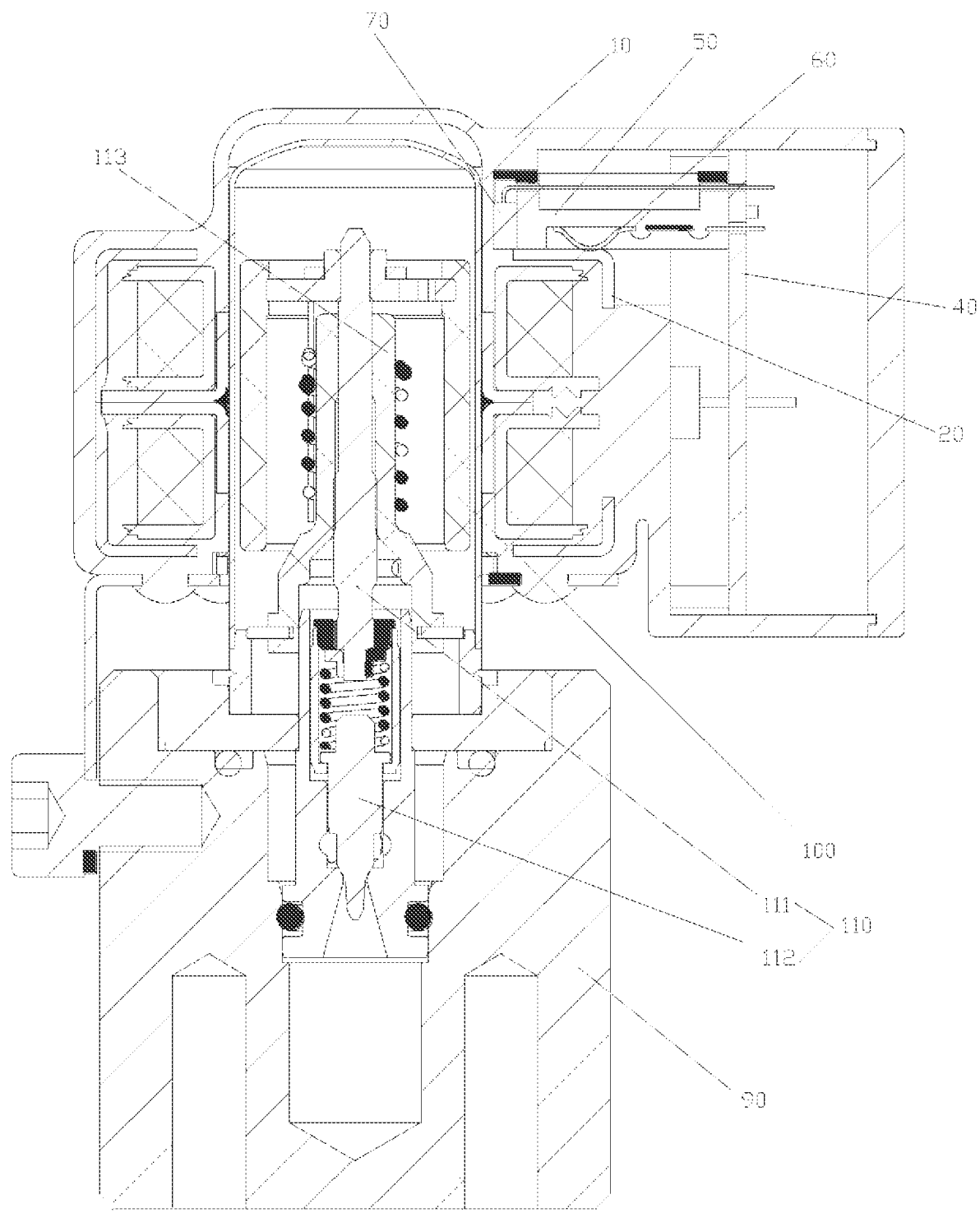
FIG. 9 shows a cross-sectional structure schematic diagram of an electronic expansion valve according to the embodiment of the present disclosure.

The electronic expansion valve of some embodiments of the present disclosure, as shown in FIG. 9, at least includes a coil component and a valve body 90. The coil component at least includes a positioning piece, a winding 80, a circuit board 40, a stator pole plate 30, a stator housing 20, and a non-conductive plastic housing (injection molded part 10) covering the stator housing 20. Inside the coil component, the stator housing 20 and the circuit board 40 are in conductive contact with each other through the conductive part 60. The structural design of the electronic expansion valve ensures that the stator pole plate 30 and the stator housing 20 inside the coil are connected with the circuit board 40 through an elastic metal sheet (conductive part 60). While the electronic expansion valve works, the static electricity on the stator pole plate 30 and the stator housing 20 is grounded after being treated by the circuit board, as to avoid the influence of the static electricity generated by the coil on other components and the influence of the static electricity generated by other components on the electronic expansion valve.

In the electronic expansion valve provided by some embodiments of the present disclosure, a coil plastic-encapsulated housing is integrally formed by injection molding, and a circuit board protection box is integrally formed on the coil, and in a circuit board mounting cavity, a limiting groove 11 is configured for limiting and fixing a Hall switch fixing part (fixing part 50), and a fixing part of the Hall switch is provided with a metal elastic sheet (conductive part 60) for conducting the stator housing 20 and the circuit board 40. The stator pole plate 30 and the stator housing 20 are assembled together, and good electrical contact is formed. While the conductive part 60 is in electrical contact with one of the stator housings 20, the conductive part 60 is in electrical contact with all the stator pole plates and the stator housing inside the coil. The stator pole plate 30 and the stator housing 20 on the coil are grounded after being treated by the circuit board 40 through the metal elastic sheet.

In the electronic expansion valve provided in some embodiments of the present disclosure, as shown in FIG. 9, the electronic expansion valve further includes a rotor component 100 and a valve needle component 110. The coil component is sleeved on the valve body 90 for generating a rotating magnetic field, and the rotor component 100 is mounted in the valve body, the valve needle component 110 includes a screw component 111 and a valve needle 112 connected up and down. An upper part of the valve needle component 110 passes through the rotor component 100 and is fixedly connected with it. Herein, a nut component 113 is arranged around an outer side of the valve needle component 110, the nut component 113 is located on a middle of the valve needle component 110, the nut component 113 is cooperated with the screw component 111 through a thread, an outer circumference of the nut component 113 is provided with a stop component for controlling the up and down stroke of the valve needle. While electrified, the rotor component 100 is rotated by a driving force of the coil component, the screw component 111 fixedly connected with the rotor component 100 is driven to rotate together. Under an action of a thread pair between the nut component 113 and the screw component 111, the screw component 111 is upwards and downwards moved relative to the nut component 113 while being rotated, thereby the valve needle 112 is driven to move up and down, so an adjustment of an opening degree of the valve needle 112 is achieved.

From the above descriptions, it may be seen that the above embodiments of the present disclosure achieve the following technical effects:

The coil component of some embodiments of the present disclosure realizes the conductive connection of at least one of the stator housing 20 and the stator pole plate 30 with the circuit board 40 through the conductive part 60, namely the static electricity generated on the stator housing 20 and the stator pole plate 30 is sent to the circuit board 40 for treatment through the conductive part 60, thereby the effect of the static electricity generated on the stator housing 20 and the stator pole plate 30 to the coil component is avoided, and the problem in the technology that the static electricity generated by the stator pole plate and the stator housing may not be discharged is solved.

It should be noted that the terms "first" and "second" in the description and claims of the present disclosure and the above drawings are used to distinguish similar objects, and are not necessarily used to describe a specific sequence or a precedence order. It should be understood that data used in this way may be interchanged under appropriate circumstances, so that the implementation modes of the present disclosure described herein may be implemented in a sequence other than those illustrated or described herein, for example. In addition, the terms "including" and "having" and any variations of them are intended to cover non-exclusive inclusions. For example, a process, a method, a system, a product, or a device that includes a series of steps or units is not necessarily limited to those clearly listed steps or units, but may include other steps or units that are not clearly listed or are inherent to these process, method, product or device.

For ease of description, spatial relative terms may be used here, such as "upon", "above", "above the surface", "on" and the like, to describe a spatial positional relationship between one device or feature and other devices or features as shown in the figures. It should be understood that the spatial relative terms are intended to encompass different orientations in use or operation other than the orientation of the device described in the figure. For example, if the device in the drawing is inverted, then a device described as "above other devices or structures" or "on other devices or structures" may be positioned as "below the other devices or structures" or "under other devices or structures". Thus, the exemplary term "above" may include both orientations "above" and "below". The device may also be positioned in other different ways (rotated by 90 degrees or in other orientations), and the relative description of the space used here is explained accordingly.

The above are only some embodiments of the present disclosure, and are not intended to limit the present disclosure. For those skilled in the art, the present disclosure may have various modifications and changes. Any modifications, equivalent replacements, improvements and the like made within the spirit and principle of the present disclosure shall be included in a scope of protection of the present disclosure.

What claimed is:

1. A coil component, comprising an injection molded part, a stator housing, a stator pole plate and a circuit board, the stator housing, the stator pole plate and the circuit board are all arranged in the injection molded part, wherein the coil component further comprises:
- a fixing part, wherein the fixing part is arranged in the injection molded part;
- a conductive part, wherein the conductive part is arranged on the fixing part, the conductive part is configured to conductively connect at least one of the stator housing and the stator pole plate to the circuit board; and
- a sensor, wherein the sensor is arranged on the fixing part, and the sensor is connected with the circuit board;
- wherein a first connecting part is arranged on the fixing part, and a second connecting part is arranged on the conductive part, the first connecting part is connected with the second connecting part.

2. The coil component according to claim 1, wherein the first connecting part comprises a protrusion, the second connecting part comprises a positioning hole, and the first connecting part passes through the second connecting part; or, the first connecting part comprises a positioning hole, the second connecting part comprises a protrusion, and the second connecting part passes through the first connecting part.

3. The coil component according to claim 1, wherein the fixing part is made of plastic, the first connecting part comprises a protrusion, and the second connecting part comprises a positioning hole, wherein, the first connecting part and the second connecting part are fixedly connected by hot riveting or ultrasonic welding.

4. The coil component according to claim 1, wherein a first mounting groove is arranged on the fixing part, and the first connecting part is arranged in the first mounting groove, wherein, at least part of the conductive part (60) is arranged in the first mounting groove.

5. The coil component according to claim 1, wherein the conductive part comprises an elastic sheet, the conductive part is connected with the circuit board, and at least one of the stator housing and the stator pole plate is connected with the conductive part.

6. The coil component according to claim 5, wherein the stator housing is connected with the stator pole plate, and the at least one of the stator housing and the stator pole plate is contacted with the conductive part.

7. The coil component according to claim 6, wherein the conductive part comprises:
- a first conductive section, wherein the first conductive section is connected with the fixing part;
- a second conductive section, wherein the second conductive section is connected with the circuit board; and
- an abutting section, wherein the abutting section is a curved section, the abutting section abuts against the stator housing,
- wherein, the first conductive section is located between the abutting section and the second conductive section, as to connect the second conductive section and the abutting section.

8. The coil component according to claim 1, wherein the fixing part is provided with a through hole, and the sensor comprises:
- a body part arranged on the fixing part; and
- a pin arranged on the body part, wherein the pin passes through the through hole and is connected with the circuit board.

9. The coil component according to claim 8, wherein a second mounting groove is arranged at an end, away from the circuit board, of the fixing part, the body part is arranged in the second mounting groove, a side, away from the conductive part, of the fixing part is provided with an accommodating groove, and a part of the pin is arranged in the accommodating groove.

10. The coil component according to claim 1, wherein the injection molded part is provided with a limiting groove, and the fixing part is arranged in the limiting groove.

11. An electronic expansion valve, comprising the coil component according to claim 1.

12. The coil component according to claim 2, wherein the conductive part comprises an elastic sheet, the conductive part is connected with the circuit board, and at least one of the stator housing and the stator pole plate is connected with the conductive part.

13. The coil component according to claim 3, wherein the conductive part comprises an elastic sheet, the conductive part is connected with the circuit board, and at least one of the stator housing and the stator pole plate is connected with the conductive part.

14. The electronic expansion valve according to claim 11, wherein a first connecting part is arranged on the fixing part, and a second connecting part is arranged on the conductive part, the first connecting part is connected with the second connecting part.

15. The coil component according to claim 14, wherein the first connecting part comprises a protrusion, the second connecting part comprises a positioning hole, and the first connecting part passes through the second connecting part; or, the first connecting part comprises a positioning hole, the second connecting part comprises a protrusion, and the second connecting part passes through the first connecting part.

16. The coil component according to claim 14, wherein the fixing part is made of plastic, the first connecting part comprises a protrusion, and the second connecting part comprises a positioning hole, wherein, the first connecting part and the second connecting part are fixedly connected by hot riveting or ultrasonic welding.

17. The coil component according to claim 14, wherein a first mounting groove is arranged on the fixing part, and the first connecting part is arranged in the first mounting groove, wherein, at least part of the conductive part (60) is arranged in the first mounting groove.

18. The coil component according to claim 11, wherein the conductive part comprises an elastic sheet, the conductive part is connected with the circuit board, and at least one of the stator housing and the stator pole plate is connected with the conductive part.

19. A coil component, comprising an injection molded part, a stator housing, a stator pole plate and a circuit board, the stator housing, the stator pole plate and the circuit board are all arranged in the injection molded part, wherein the coil component further comprises:
- a fixing part, wherein the fixing part is arranged in the injection molded part;
- a conductive part, wherein the conductive part is arranged on the fixing part, the conductive part is configured to conductively connect at least one of the stator housing and the stator pole plate to the circuit board; and
- a sensor, wherein the sensor is arranged on the fixing part, and the sensor is connected with the circuit board;
- wherein the fixing part is provided with a through hole, and the sensor comprises:
- a body part arranged on the fixing part; and
- a pin arranged on the body part, wherein the pin passes through the through hole and is connected with the circuit board.

20. The coil component according to claim 19, wherein a second mounting groove is arranged at an end, away from the circuit board, of the fixing part, the body part is arranged in the second mounting groove, a side, away from the conductive part, of the fixing part is provided with an accommodating groove, and a part of the pin is arranged in the accommodating groove.

\* \* \* \* \*